(12) United States Patent
Leuthner et al.

(10) Patent No.: US 7,100,384 B2
(45) Date of Patent: Sep. 5, 2006

(54) SYSTEM AND METHOD FOR COOLING OR HEATING

(75) Inventors: Stephan Leuthner, Stuttgart (DE); Peter Satzger, Korntal (DE); Petra Kanters, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 10/204,955

(22) PCT Filed: Nov. 2, 2001

(86) PCT No.: PCT/DE01/04135

§ 371 (c)(1),
(2), (4) Date: Aug. 27, 2002

(87) PCT Pub. No.: WO02/053399

PCT Pub. Date: Jul. 11, 2002

(65) Prior Publication Data

US 2003/0154730 A1 Aug. 21, 2003

(51) Int. Cl.
*F25B 13/00* (2006.01)

(52) U.S. Cl. .......................................... 62/160; 62/324.6
(58) Field of Classification Search ................ 62/324.6, 62/160, 513, 113; 165/202
See application file for complete search history.

(56) References Cited

U.S. PATENT DOCUMENTS

| 4,645,908 A | * | 2/1987 | Jones | 219/378 |
| 6,516,623 B1 | * | 2/2003 | Collier | 62/238.7 |
| 2002/0014330 A1 | * | 2/2002 | Guyonvarch | 165/202 |

FOREIGN PATENT DOCUMENTS

| DE | 197 52 259 A | 6/1998 |
| DE | 199 56 252 A | 5/2000 |
| EP | 0 566 854 A | 10/1993 |
| EP | 1 176 036 A | 1/2002 |

\* cited by examiner

*Primary Examiner*—Marc Norman
(74) *Attorney, Agent, or Firm*—Michael J. Striker

(57) ABSTRACT

The invention relates to a system for cooling and heating, having a first heat exchanger (10) for outputting heat to and extracting it from a heat reservoir (12); a second heat exchanger (14) for extracting heat from and outputting it into a space (16) to be cooled or heated; a compressor (18); an expansion device (20); and means (22, 24) for switchover between a cooling mode and a heating mode; wherein the switchover means (22, 24) are integrated with a module (26). The invention also relates to a method for switching over between a cooling mode and a heating mode.

19 Claims, 6 Drawing Sheets

SYSTEM AND METHOD FOR COOLING OR HEATING

BACKGROUND OF THE INVENTION

The invention relates to a system for cooling and heating, having a first heat exchanger for outputting heat to and extracting it from a heat reservoir; a second heat exchanger for extracting heat from and outputting it into a space to be cooled or heated; a compressor; an expansion device; and means for switchover between a cooling mode and a heating mode. The invention also relates to a method for switching over between a cooling mode and a heating mode by means of a system having a first heat exchanger for outputting heat into and extracting it from a heat reservoir, a second heat exchanger for extracting heat from and outputting it into a space to be cooled or heated, a compressor, an expansion device, and means for switchover between a cooling mode and a heating mode.

Systems and methods of this generic type are known, particularly for cooling and heating internal compartments of motor vehicles. Cooling with such systems and methods using an air conditioner built into a motor vehicle has already been known for a long time. Increasingly, however, heating with such systems is also gaining in importance. The reason for this is not least the development of engines with optimized fuel consumption, since in these engines not enough heat is output to the coolant to heat the vehicle comfortably in low-load operation at low temperatures. This is true particularly for direct-injection Diesel engines, which already fundamentally have additional heaters to assure comfort at low temperatures. Motor vehicles with direct gasoline injection will in future also have to be equipped with additional heaters, if a comfortable interior temperature is to be maintained.

Most vehicles in the top price class and increasingly the middle price class as well have an air conditioner as standard equipment. At low ambient temperatures, the components of such an air conditioner can be utilized as a heat pump by reversing the heat circulation. Such a heat pump is distinguished by low energy consumption and spontaneous response performance at high heating capacity. With a view to safety, window de-icing, and passenger comfort, this is an appropriate concept for designing additional heaters for the future.

In FIGS. 5 and 6, two air conditioner circuits are shown; in FIG. 5, a conventional cooling mode is illustrated, while in FIG. 6 a heating mode is shown, with the components additionally required for the heating mode.

In FIG. 5, an air conditioner circuit is shown schematically. A first medium enters a first heat exchanger 110 and flows through a loop 160. The medium outputs heat to the ambient air 162 and thus cools itself. From the heat exchanger 110, a cooled medium emerges. This cooled medium is now passed through an internal heat exchanger 128, whose function will be explained hereinafter. After the medium has emerged from the internal heat exchanger 128, it enters an expansion device 120. The medium cools down sharply by expansion and is then delivered to a second heat exchanger 114. In this heat exchanger 114, the cold medium can cool down warm ambient air or circulating air and can be made available in the form of cold air 164 to a space to be cooled, such as the vehicle interior. In this process, formation of condensate 166 occurs. The medium, now re-heated and evaporated because of the heat exchange in the heat exchanger 114, emerges from the heat exchanger 114 and then flows through the internal heat exchanger 128 again. After emerging from the internal heat exchanger 128, the medium enters a compressor 118, where by compression it is put at a higher pressure and heated. A heated medium is thus again available, which can enter the first heat exchanger 110 for the purpose of heat exchange. The loop is closed.

The internal heat exchanger 128 serves to increase the capacity of the loop. Thus the medium before entering the expansion device 120 is cooled by the returning medium that has emerged from the second heat exchanger 114, while the returning medium is heated by reflux. As a result of this heat exchange, the proportion of liquid in the fluid upon leaving the expansion device 120 is increased. This increases the efficiency in the loop.

In FIG. 6, a loop is shown which in comparison with FIG. 5 is equipped with additional components. These components are required in order to use the loop for heating a space. Once again, the loop will be described beginning at the inflow of the medium into the first heat exchanger 110. Cold medium enters the heat exchanger 110. In the heat exchanger, the cold medium is heated and evaporated by interaction with the ambient air 162, while the ambient air is cooled down. Depending on the temperature, the formation of condensate or ice 168 can occur. After the medium flows out of the first heat exchanger, it flows via a first valve 170 into the internal heat exchanger 128. After the medium emerges from the internal heat exchanger 128, it flows into the compressor 118, where it is compressed and heated. Once the medium has left the compressor, it flows via a second valve 172 into the second heat exchanger. There, the heated medium can heat cold ambient air or cold circulating air and thus can be available as useful heat 174 to a space to be heated. The medium emerges in the cooled state from the second heat exchanger 114 and then flows into a third valve 176. This third valve 176 directs the flow of the medium to a fourth valve 178, where once again the medium is directed such that it enters the internal heat exchanger 128. After emerging from the internal heat exchanger 128, the medium enters the expansion device 120, where it is cooled by expansion, and then via a valve 178 it is directed into the first heat exchanger again. The loop of the medium is closed.

Once again, the internal heat exchanger 128 serves to increase the capacity. First, the heated medium, which is to be further heated in the compressor 118, is heated in the internal heat exchanger 128 by the returning medium, which in turn flows into the internal heat exchanger from the second heat exchanger 114. Second, this returning medium, before cooling down by expansion in the expansion device 120, is cooled down by the medium entering the heat exchanger, which medium has emerged from the first heat exchanger 110.

It can be seen that to achieve a system which makes both a cooling mode and a heating mode possible, additional components are required. These are in particular the valves 170, 172, 176 and 178, which by means of suitable switchover can form either a heating loop or a cooling loop. Besides the valves 170, 172, 176 and 178, other additional components are necessary, such as supplementary lines, which means a further increase in weight and further complication and expense. Also, because of the greater number of requisite lines and above all connections, the vulnerability to malfunction and in particular the incidence of leaks are increased.

SUMMARY OF THE INVENTION

The invention improves on the generic system by providing that the switchover means are integrated with a module.

The result is a compact design, in particular with economies in terms of line lengths and connections that are vulnerable to malfunction, and with less effort and expense for installation. Along with the economy in terms of lines that carry the coolant medium, the number and length of the electrical lines are also reduced, because of the modular structure.

Preferably, an internal heat exchanger is provided between the first heat exchanger and the second heat exchanger. An internal heat exchanger of this kind serves to increase the capacity of the cooling and heating system. In the case of the cooling mode, heated medium which flows out of the first heat exchanger back to the second heat exchanger is cooled prior to the expansion; for this purpose, the medium flowing from the second heat exchanger to the compressor is used. The temperature of the medium flowing back and forth is thus advantageously prepared for the next event.

It is especially preferred if the switchover means include a first valve and a second valve, each having four ports. This is an especially compact way to realize the invention, since the number of pressure connections is reduced, and moreover this favors a small design.

Preferably, the invention is refined in that in the first valve, a first port communicates with the first heat exchanger, a second port communicates with the expansion device, a third port communicates with the internal heat exchanger, and a fourth port communicates with the second heat exchanger. In the first valve, this creates the prerequisites for correctly performing the switchover of part of the loop of the medium between the heating mode and the cooling mode.

The invention is also advantageously refined in that in the second valve, a first port communicates with the first heat exchanger, a second port communicates with the internal heat exchanger, a third port communicates with the compressor, and a fourth port communicates with the second heat exchanger. Thus the second valve is likewise capable of controlling the loops required for both the heating mode and the cooling mode.

It is advantageous that in the cooling mode, the first port and the third port of the first valve communicate with one another, and the second port and the fourth port of the first valve communicate with one another, and that in the cooling mode, the first port and the third port of the second valve communicate with one another, and the second port and the fourth port of the second valve communicate with one another. Thus an adjustment of the valves that makes a cooling mode possible is available.

It is also advantageous that in the heating mode the first port and the second port of the first valve communicate with one another, and the third port and the fourth port of the first valve communicate with one another; and that in the cooling mode, the first port and the second port of the second valve communicate with one another, and the third port and the fourth port of the second valve communicate with one another. In this way, the medium is carried through the system in the way that is advantageous for the heating mode.

It is especially useful if the switchover means are actuatable at least in part by a common drive mechanism. This reduces the number of required components.

In this conjunction, it can be especially advantageous if the switchover means are actuatable at least partly by a hydraulic or pneumatic drive mechanism, for instance with the refrigerant. A hydraulic or pneumatic drive mechanism of this kind can be supplied directly or indirectly by means of a pressure difference of the refrigerant at the compressor. For this triggering, a very small magnet valve suffices.

It is also useful if the internal heat exchanger is integrated with the module. Because not only the switchover means, for instance, but also the heat exchanger are integrated, a further reduction in the structural size is achieved.

For the same reason, it can be useful if the expansion device is integrated with the module. This has the advantage, among others, that once again a further reduction in size is achieved, which also shortens the hydraulic courses.

It is especially useful if the compressor is integrated with the module. This too can lead to a further reduction in size of the system.

Usefully, a collector can be integrated with the module. In systems with a collector, integrating this component can likewise reinforce the advantages of the invention.

For the same reason, it can be useful if an oil filter is integrated with the module.

Also in a useful way, a hot-gas bypass valve is integrated with the module, which can serve to de-Ice the outside air heat exchanger.

Still another integrating provision is made available within the scope of the invention by providing that pressure sensors are integrated with the module. These can serve to sense both the high and the low pressure. By integrating a control unit for all the valves and for the compressor with the module, the external electrical installation effort and expense can be reduced.

It is especially advantageous if at least some of the components that can be integrated with the module are disposed in a common pressure housing. By means of such a common pressure housing, the tightness of the module and thus of the air conditioner can be increased. Because a common pressure housing is used, materials can be used inside the pressure housing that could not be used until now, because of the great pressure differences. For instance, it is conceivable to use plastics. It is also possible for lines that are under pressure to be designed with thinner wall thicknesses, so that in this way as well, additional weight can be saved.

The invention exhibits its particular advantages within the context of a system in which $CO_2$ is provided as the medium for the cooling loop and heating loop. Such $CO_2$-based cooling systems will become increasingly important in the future, since in them a conventional refrigerant is replaced by a substance that presents no problems whatever of disposal, namely $CO_2$. Especially because of the possibilities of increasing the capacity by means of an internal heat exchanger, the invention is especially useful in conjunction with $CO_2$ as a coolant and heating agent.

The invention improves on the generic method by providing that the switchover means are integrated with a module. As a result, a method on the basis of a compact design is available, in which in particular the line lengths and weight are reduced, as are the effort and expense of installation. Along with the economy in terms of lines that carry the cooling medium, the number and length of electrical lines can also be reduced because of the modular structure.

Preferably, the method of the invention is refined in that heat is exchanged in an internal heat exchanger, which is disposed between the first heat exchanger and the second heat exchanger. Such an internal heat exchanger serves to increase the capacity of the cooling and heating system. In the case of the cooling mode, heated medium which flows back out of the second heat exchanger to the first heat exchanger is preheated before the compression, and for this purpose, the medium flowing from the first heat exchanger to the expansion device is used. The temperature of the medium flowing back and forth is accordingly advantageously prepared for the next event.

The method of the invention is especially advantageously refined in that the switchover means include a first valve and a second valve, each having four ports; that in the first valve, a first port communicates with the first heat exchanger, a second port communicates with the expansion device, a third port communicates with the internal heat exchanger, and a fourth port communicates with the second heat exchanger; that in the second valve, a first port communicates with the first heat exchanger, a second port communicates with the internal heat exchanger, a third port communicates with the compressor, and a fourth port communicates with the second heat exchanger; that a switchover to the cooling mode is made by causing the first port and the third port of the first valve to communicate with one another and causing and the second port and the fourth port of the first valve to communicate with one another, and by causing the first port and the third port of the second valve to communicate with one another, and causing and the second port and the fourth port of the second valve to communicate with one another. In the first valve, this creates the prerequisites for correctly performing the switchover of part of the loop of the medium between the heating mode and the cooling mode.

Preferably, a switchover to the heating mode is made by causing the first port and the second port of the first valve to communicate with one another, and causing the third port and the fourth port of the first valve to communicate with one another, and by causing the first port and the second port of the second valve to communicate with one another and causing the third port and the fourth port of the second valve to communicate with one another. Thus the second valve is likewise capable of controlling the loops required for both the heating mode and the cooling mode.

It is preferred that the switchover means are actuatable at least in part by a common drive mechanism. This reduces the number of required components.

It is likewise useful if the switchover means are actuatable at least in part by a hydraulic drive mechanism. For this triggering, a very small magnet valve suffices.

Preferably, $CO_2$ is provided as the medium for the cooling loop and heating loop. Such cooling systems on the basis of $CO_2$ will gain increasing significance in future, since a conventional refrigerant is replaced with a substance, namely $CO_2$ that can be disposed of without problems. Especially because of the capabilities of increasing the capacity by means of an internal heat exchanger, the invention in conjunction with $CO_2$ as a coolant and heating agent are especially useful.

Preferably, the internal heat exchanger is constructed by μ-structuring. Especially if $CO_2$ is the refrigerant, combining the components in the module 26 makes it possible to use components of the μ-structured type, since as a result the pressure losses inside the module are sufficiently low.

The invention is based on the surprising discovery that the switchover function between a cooling mode and a heating mode can be achieved with a compact design. By furnishing a module which contains essential components of the system, the number of pressure connections, the number of hydraulic lines, the number of electrical lines, and other effort and expense can all be reduced. Furthermore, the structural size is reduced and weight is saved.

BRIEF DESCRIPTION OF THE DRAWINGS

The invention will now be described in terms of preferred embodiments as examples, in conjunction with the accompanying drawings.

Shown are.

DESCRIPTION OF THE PREFERRED EMBODIMENTS

Figure 1:
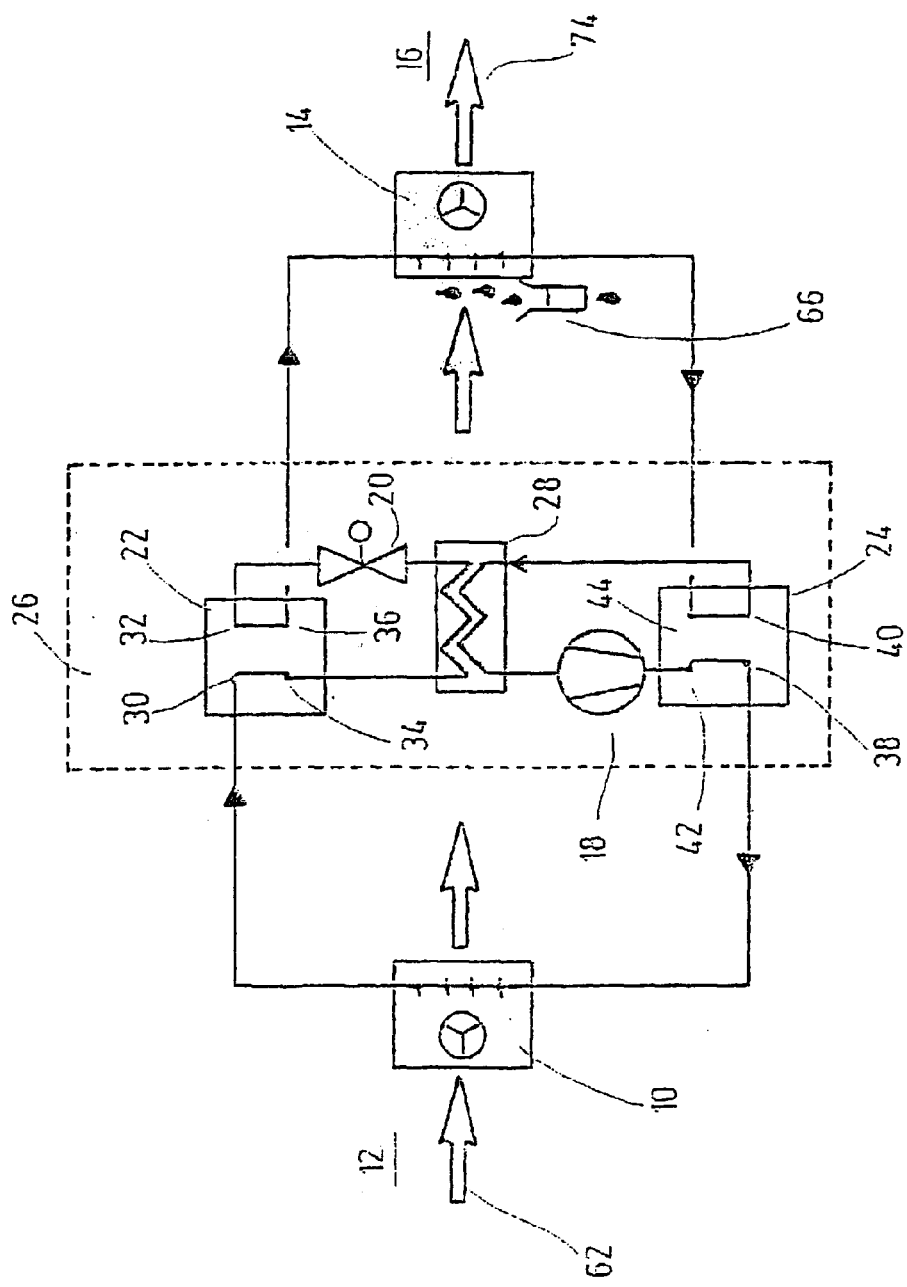
FIG. 1, a schematic illustration of a first embodiment of the invention.

In the ensuing description of the drawings, components that are the same or comparable will be identified by the same reference numerals.

FIG. 1 shows a schematic illustration of a system according to the invention for cooling and heating. The switchable components of the system are switched, in the illustration of FIG. 1, in such a way that the system is in the cooling mode. A medium is introduced into the first heat exchanger 10. In the heat exchanger, an exchange of heat takes place between a heat reservoir 12 and the introduced medium, so that ambient air 62 is heated, and the medium is cooled in reflux. The cooled medium leaves the first heat exchanger 10 and then enters a module 26.

The events that take place in the module 26 will be described hereinafter.

The medium emerges from the module 26 in cooled form and then enters a second heat exchanger 14. In this second heat exchanger, ambient air or circulating air also enters, so that an air flow 74 that is cooled in the heat exchanger 14 enters the space 16 to be cooled. This creates condensate 66. The medium, heated and evaporated because of the cooling of the ambient air or circulating air 74 emerges from the second heat exchanger 14. Next, the medium enters the module 26. In this module, the medium is heated and brought to a higher pressure. From the module 26, heated and compressed medium then emerges, so that it can be returned to the first heat exchanger again. The loop is closed.

Integrated with the module 26 are a plurality of components which are essential to the operation of the system. The module 26 includes a first valve 22, with a first port 30, a second port 32, a third port 34, and a fourth port 36. The module 26 further includes a second valve 24, with a first port 38, a second port 40, a third port 42, and a fourth port 44. The module 26 further includes a compressor 18, an expansion device 20, and an internal heat exchanger 28. In FIG. 1, the first valve 22 and the second valve 24 are switched in such a way that the system is in the cooling mode. If the medium cooled in the first heat exchanger 10 now enters the module 26 and thus the first valve 22, then it first reaches the first port 30. The first port 30 communicates with the third port 34. The third port 34 communicates with the internal heat exchanger 28. The medium is thus conducted into the internal heat exchanger 28, whose function will be described hereinafter. After the medium emerges from the internal heat exchanger 28, it enters an expansion device 20. In this expansion device 20, the medium is expanded and thus cooled. The medium emerging from the expansion device 20 reaches the second port 32 of the valve 22, which port communicates with the expansion device 20.

The second port 32 communicates with the fourth port 36 of the first valve, so that the medium is carried to the fourth port 36. From there, the medium emerges from the module 26 and enters the second heat exchanger 14.

In the return of the medium, the medium again flows through the module 26. The medium enters the module 26, where it first reaches the fourth port 44 of the second valve. The fourth port 44 of the second valve 24 communicates with the second port 40 of the second valve 24. The medium is thus carried to the second port 40 of the second valve 24, and from there it is carried to the internal heat exchanger 28, which communicates with the second port 40 of the second valve 24. After passing through the internal heat exchanger, the medium emerges from the internal heat exchanger 28 and reaches a compressor 18. In this compressor 18, the medium is heated and compressed. The outlet of the compressor communicates with the third port 42 of the second valve. In the present switching state, the third port 42 communicates with the first port 38 of the second valve 24. The medium is thus carried from the third port 42 of the second valve 24 to the first port 38 of the second valve 24. The first port communicates with the first heat exchanger 10, so that the medium emerges from the module 26 and can reach the first heat exchanger 10.

Particularly if the system is operated with $CO_2$ as the cooling medium, it proves useful to provide an internal heat exchanger 28. This internal heat exchanger serves to increase the capacity. The medium flowing into the expansion device 20 is cooled by the returned medium. In reflux, the returned medium, which flows into the compressor 18, is heated by the inflowing medium.

Figure 6:
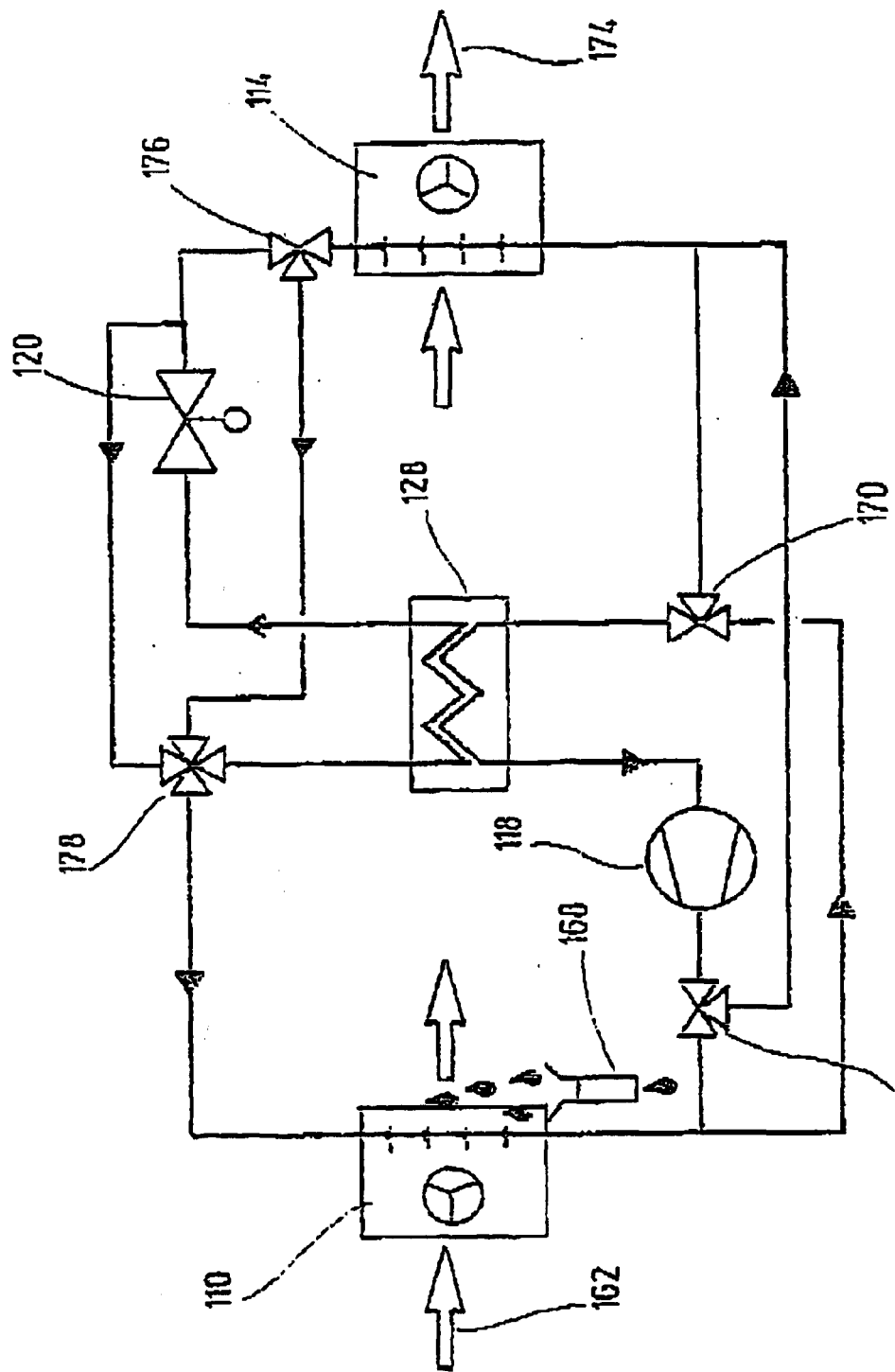
FIG. 6, a schematic illustration of a second embodiment in the prior art.

It can be seen from FIG. 1 that only four external pressure connections are needed for the module 26, namely the first port 30 of the first valve 22 for the communication with the first heat exchanger 10; the third port 36 of the first valve 22 for the communication of the first valve 22 with the second heat exchanger 14. The first port 38 of the second valve 24 for the communication of the second valve 24 with the first heat exchanger 10; and the fourth port 44 of the second valve 24 for the communication of the second valve 24 with the second heat exchanger 14. Thus in comparison to the embodiment of FIG. 6, for instance, which has been explained in the description of the prior art, considerable economies in terms of line lengths are achieved. The effort and expense of installation are also reduced.

It also conceivable for the compressor 18 not to be integrated with the module 26. In such an arrangement, the module 26 should be equipped with two further pressure connections, which once again still reduces the complexity of the hydraulic circuitry considerably. Moreover, the components can be integrated either entirely or partly in one block. Thus a compact representation of the module can be achieved. A tight embodiment can thus be made possible in a simpler way.

Figure 2:
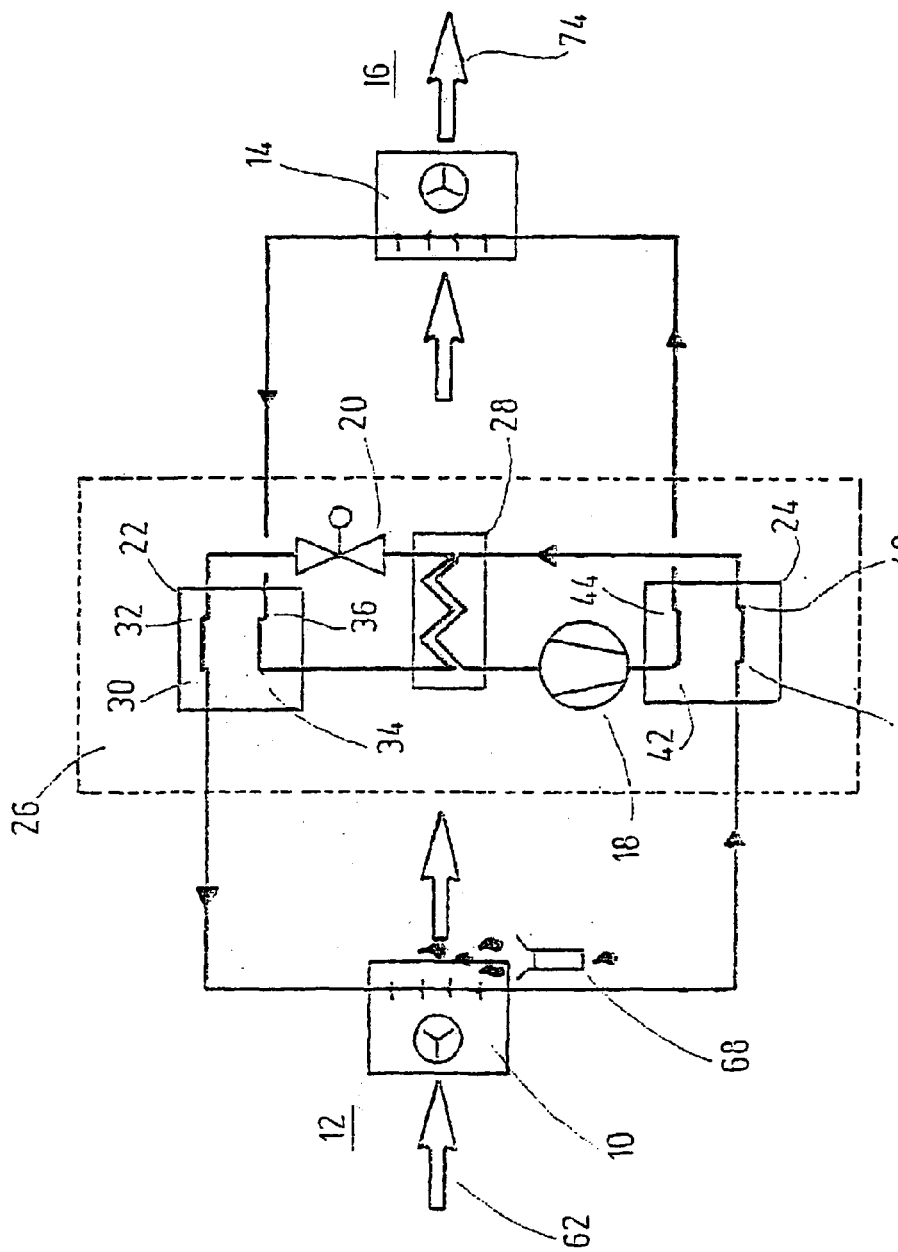
FIG. 2, a schematic illustration of the first embodiment of the invention in a modified mode of operation.

In FIG. 2, the system of FIG. 1 is shown in a different switching state. The system of FIG. 2 is in the heating mode. The switchover from the cooling mode of FIG. 1 to the heating mode of FIG. 2 is done by switchover of the first valve 22 and the second valve 24. In the first valve 22, the first port 30 now communicates with the second port 32. The third port 34 of the first valve 22 communicates with the fourth port 36 of the first valve 22. In the second valve 24, the first port 38 communicates with the second port 40. The third port 42 communicates with the fourth port 44. If cold medium now flows into the first heat exchanger 10, it absorbs heat from the heat reservoir 12, so that the ambient air 62 is cooled down. This can produce condensate or ice 68. After the first medium emerges from the first heat exchanger 10, the medium enters the module 26 in the heated state. There, it reaches the first port 38 of the second valve 24. The first port 38 communicates with the second port 40, which communicates with the internal heat exchanger 28. The medium is thus carried to the internal heat exchanger 28. After the medium has passed through the internal heat exchanger 28, it enters the compressor 18, and then it reaches the third port 42 of the second valve 24. This third port 42 of the second valve 24 communicates with the fourth port 44 of the second valve 24, which port is in communication with the second heat exchanger 14. Thus the medium passes in the heated state from the compressor 18 to reach the second heat exchanger 14. In this second heat exchanger, ambient air or circulating air is heated, so that finally, warm air 24 can be output to a space 16 to be heated. In the process, the medium cools down. The cooled medium is returned to the module 26. There, the medium first reaches the fourth port 36 of the first valve 22. The fourth port 36 of the first valve 22 communicates with the third port 34 of the first valve 22. This fourth port 34 is in communication with the internal heat exchanger 28. Thus from the second heat exchanger 14, the medium reaches the internal heat exchanger 28. After the medium passes through the internal heat exchanger 28, it enters the expansion device 20, where it expands and cools down. After emerging from the expansion device 20, the medium reaches the second port 32 of the first valve 22. The second port 32 communicates with the first port 30 of the first valve 22, which is in communication with the first heat exchanger 10. Thus from the expansion device 20, the medium passes in the cooled state via the second port 32 and the first port 30 of the first valve 22 to reach the first heat exchanger 10. The loop is closed.

Once again, in the heating mode as well, the internal heat exchanger 28 serves to increase the capacity, which is especially preferable in operation using $CO_2$ as the medium. Before entering the compressor and the internal heat exchanger 28, the medium is heated, which occurs by the interaction with the returning medium from the second heat exchanger 14. In reflux, the returning medium is cooled down, before the expansion in the expansion device 20, by interaction with the inflowing medium.

The switchover between the switching states of FIG. 1 and FIG. 2 can be done in a rational way such that common drive mechanisms can be used for those elements that are to be switched simultaneously. This reduces the switching complexity and also the weight of the module 26 and thus of the entire system. It can be especially advantageous that for triggering the valves a hydraulic drive mechanism is used, which is supplied by the pressure difference at the compressor. For triggering such a hydraulic mechanism, either a single or several very small magnet valves can be used. The apparatus of FIGS. 1 and 2 can also be refined such that pressure sensors for high and low pressure are also integrated with the module 26.

Figure 3:
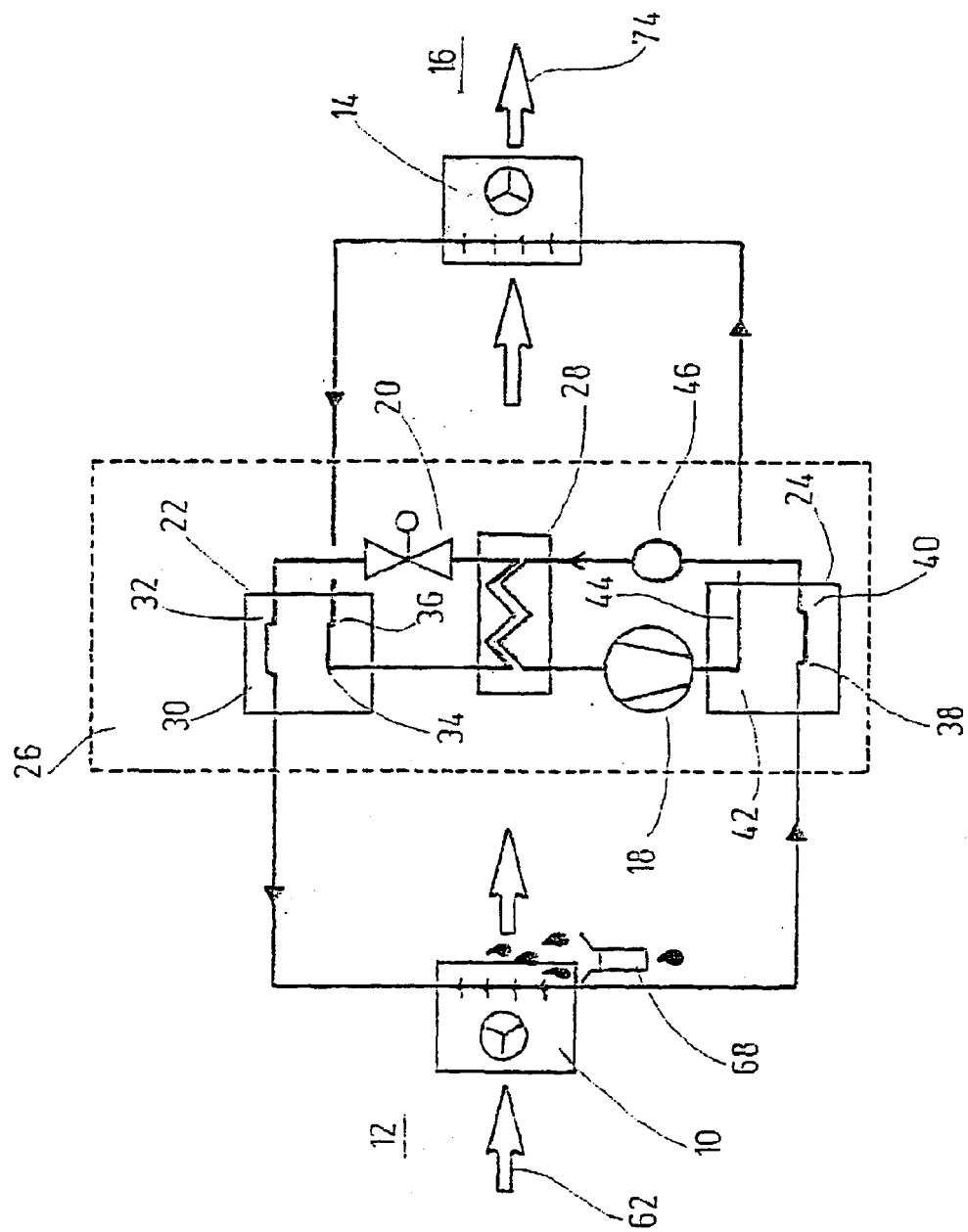
FIG. 3, a schematic illustration of a third embodiment of the invention.

In FIG. 3, a further schematic illustration of a system of the invention is shown. It corresponds largely to what is shown in FIG. 2. In addition to FIG. 2, a collector 46 is integrated with the module 26; in the heating mode shown, this collector is disposed on the inlet side of the internal heat exchanger 28, and it communicates with the second port 40 of the first valve 24. The collector 46 serves both to keep refrigerant on hand and to separate liquid from the gas that can enter the module 26. An advantageous embodiment provides that all or some components of the module 26 are integrated in a pressure vessel, which then acts as a collector.

This not only makes for economy in terms of installation space, but above all the sealing off of the components from the outside can be performed by the pressure vessel. This makes low-leakage manufacture of the module 26 much easier.

Figure 4:
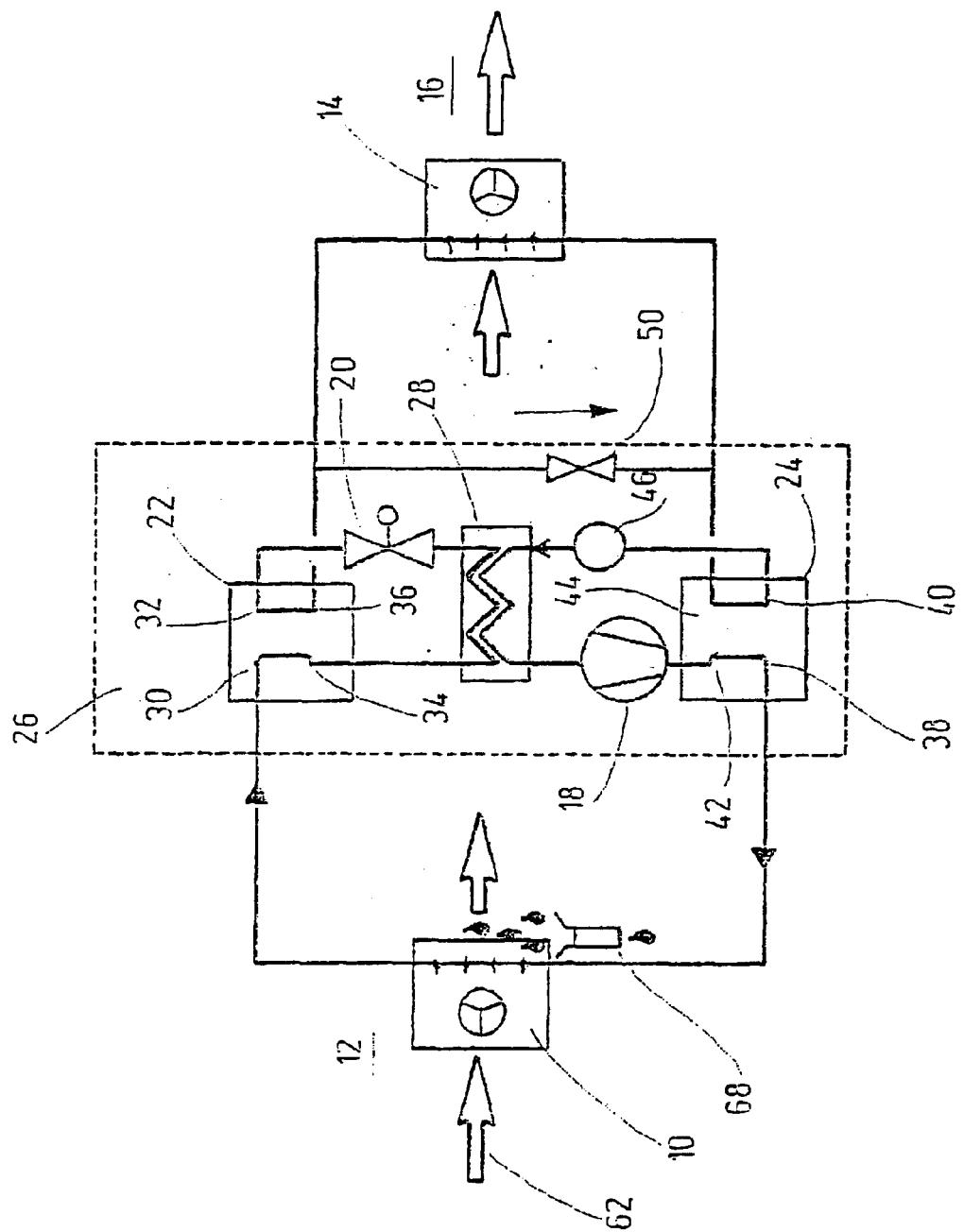
FIG. 4, a schematic illustration of a fourth embodiment of the invention.
Figure 5:
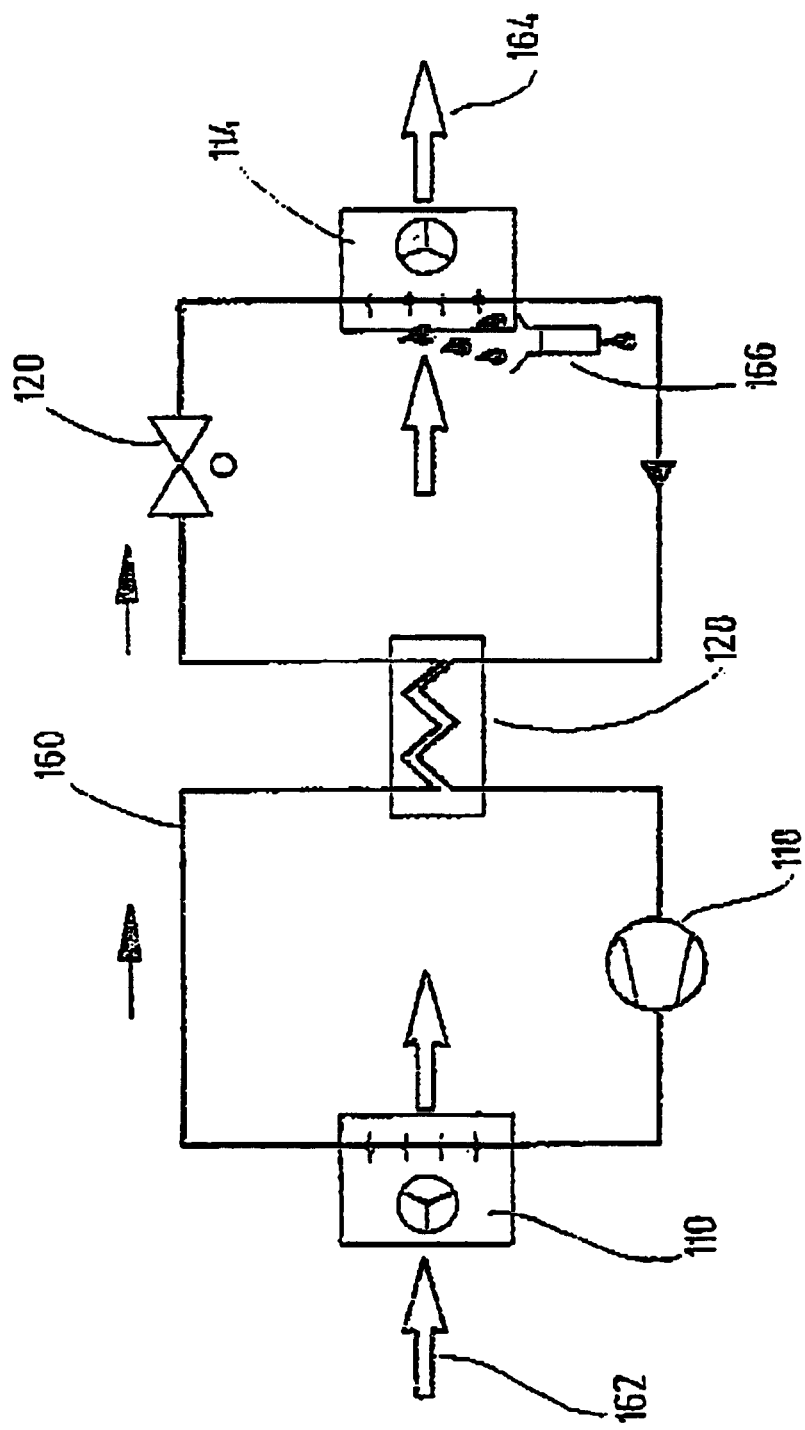
FIG. 5, a schematic illustration of a first embodiment in the prior art.

In FIG. 4, a further schematic illustration of a system of the invention is shown. In addition to the components of FIG. 3, it has a hot-gas bypass valve 50. This valve 50 connects the inlet side to the outlet side of the second heat exchanger 14. This valve 50, too, can be integrated with the module 26. The system is shown in a switching state for hot-gas/thawing operating mode. Short-circuiting the heat exchanger 14 by means of the valve 50 means that a large proportion of the fluid from the expansion device 20 reaches the valve 24 directly. As a result, virtually no heat is transferred in the heat exchanger 14. The waste heat from the system is output by the fluid completely in the heat exchanger 10. As a result, ice located on the air side of this heat exchanger can be blasted off or melted.

The above description of the exemplary embodiments of the present invention is intended for solely illustrative purposes and not for the sake of limiting the invention. Within the scope of the invention, various changes and modifications may be made without departing from the scope of the invention and its equivalents.

What is claimed is:

1. A system for cooling and heating, having
   a first heat exchanger for outputting heat to and extracting it from a heat reservoir,
   a second heat exchanger for extracting heat from and outputting it into into a space to be cooled or heated,
   an internal heat exchanger provided between the first heat exchanger and the second heat exchanger,
   a compressor,
   an expansion device, and
   means for switchover between a cooling mode and a heating mode,
   characterized in that the switchover means are integrated with a module and include a first valve and a second valve each having four ports, wherein in the first valve
   a first port communicates with the first heat exchanger,
   a second port communicates with the expansion device,
   a third port communicates with the internal heat exchanger; and
   a fourth port communicates with the second heat exchanger.

2. A system for cooling and heating, having
   a first heat exchanger for outputting heat to and extracting it from a heat reservoir,
   a second heat exchanger for extracting heat from and outputting it into a space to be cooled or heated,
   an internal heat exchanger provided between the first heat exchanger and the second heat exchanger,
   a compressor,
   an expansion device, and
   means for switchover between a cooling mode and a heating mode and including a first valve and a second valve,
   characterized in that the switchover means are integrated with a module,
   wherein in the second valve
   a first port communicates with the first heat exchanger,
   a second port communicates with the expansion device,
   a third port communicates with the internal heat exchanger; and
   a fourth port communicates with the second heat exchanger.

3. A system for cooling and heating, having
   a first heat exchanger for outputting heat to and extracting it from a heat reservoir,
   a second heat exchanger for extracting heat from and outputting it into into a space to be cooled or heated,
   a compressor,
   an expansion device, and
   means for switchover between a cooling mode and a heating mode,
   characterized in that the switchover means are integrated with a module and include a first valve and a second valve each having four ports, wherein the switchover means are actuatable at least in part by a common drive mechanism.

4. A system for cooling and heating, having
   a first heat exchanger for outputting heat to and extracting it from a heat reservoir,
   a second heat exchanger for extracting heat from and outputting it into into a space to be cooled or heated,
   a compressor,
   an expansion device, and
   means for switchover between a cooling mode and a heating mode,
   characterized in that the switchover means are integrated with a module,
   wherein the switchover means are actuatable at least in part by a hydraulic drive mechanism; and the switchover means include a first valve (22) and a second valve, each having four ports.

5. A system for cooling and heating, having
   a first heat exchanger for outputting heat to and extracting it from a heat reservoir,
   a second heat exchanger for extracting heat from and outputting it into into a space to be cooled or heated,
   a compressor,
   an expansion device, and
   means for switchover between a cooling mode and a heating mode,
   characterized in that the switchover means are integrated with a module,
   wherein a hot-gas bypass valve is integrated with the module; and the switchover means include a first valve (22) and a second valve, each having four ports.

6. A system for cooling and heating, having
   a first heat exchanger for outputting heat to and extracting it from a heat reservoir,
   a second heat exchanger for extracting heat from and outputting it into into a space to be cooled or heated,
   a compressor,
   an expansion device, and
   means for switchover between a cooling mode and a heating mode,
   characterized in that the switchover means are integrated with a module,
   wherein in that pressure sensors are integrated with the module; and the switchover means include a first valve (22) and a second valve, each having four ports.

7. A system for cooling and heating, having a first heat exchanger for outputting heat to and extracting it from a heat reservoir, a second heat exchanger for extracting heat from and outputting it into into a space to be cooled or heated, a compressor, an expansion device, and means for switchover between a cooling mode and a heating mode, characterized in that the switchover means are integrated with a module, wherein at least some of the components that can be integrated with the module are disposed in a common pressure housing; and the switchover means include a first valve (22) and a second valve, each having four ports.

8. A system for cooling and heating, having a first heat exchanger for outputting heat to and extracting it from a heat reservoir, a second heat exchanger for extracting heat from and outputting it into into a space to be cooled or heated, a compressor, an expansion device, and means for switchover between a cooling mode and a heating mode, characterized in that the switchover means are integrated with a module, wherein at least some of the components that can be integrated with the module (26) are disposed in a common pressure housing embodied as a collector; and the switchover means include a first valve (22) and a second valve, each having four ports.

9. A method for switchover between a cooling mode and a heating mode by means of a system having a first heat exchanger for outputting heat into and extracting it from a heat reservoir, a second heat exchanger for extracting heat from and outputting it into a space to be cooled or heated, an internal heat exchanger disposed between the first heat exchanger and the second heat exchanger, a compressor, an expansion device, and means for switchover between a cooling mode and a heating mode, characterized in that the switchover means are integrated with a module, wherein the switchover means include a first valve and a second valve, each having four ports;

that in the first valve, a first port communicates with the first heat exchanger, a second port communicates with the expansion device, a third port communicates with the internal heat exchanger, and a fourth port communicates with the second heat exchanger;

that in the second valve, a first port communicates with the first heat exchanger, a second port communicates with the internal heat exchanger, a third port communicates with the compressor, and a fourth port communicates with the second heat exchanger;

that a switchover to the cooling mode is made by causing the first port and the third port of the first valve to communicate with one another, and causing the second port and the fourth port of the first valve to communicate with one another, and by causing the first port and the third port of the second valve to communicate with one another, and causing the second port and the fourth port of the second valve to communicate with one another.

10. The system of claim 1 and 2, characterized in that in the cooling mode, the first port and the third port of the first valve communicate with one another, and the second port and the fourth port of the first valve communicate with one another; and in the cooling mode, the first port and the third port of the second valve communicate with one another, and the second port and the fourth port of the second valve communicate with one another.

11. The system of claim 1 and 2, characterized in that in the heating mode the first port and the second port of the first valve communicate with one another, and the third port and the fourth port of the first valve communicate with one another; and in the heating mode, the first port and the second port of the second valve communicate with one another, and the third port and the fourth port of the second valve communicate with one another.

12. The system of each of claims 1,2,3,4,5,6,7 and 8, characterized in that the expansion device is integrated with the module.

13. The system of claims 3,4,5,6,7 and 8, characterized in that an internal heat exchanger (28) is provided between the first heat exchanger and the second heat exchanger.

14. The system of claim 13, characterized in that the internal heat exchanger is integrated with the module.

15. The system of claim 4, characterized in that the hydraulic drive mechanism is supplied by the pressure difference upstream and downstream of the compressor.

16. The system of each of claim 1,2,3,4,5, and 6, characterized in that the compressor is integrated with the module.

17. The system of each of claims 1,2,3,4,5, and 6, characterized in that a collector is integrated with the module.

18. The system of claim 8, characterized in that the switchover means include a first valve and a second valve, each having four ports.

19. The method of claim 9, characterized in that a switchover to the heating mode is made by causing the first port and the second port of the first valve to communicate with one another, and causing the third port and the fourth port of the first valve to communicate with one another, and by causing the first port and the second port of the second valve to communicate with one another, and causing the third port and the fourth port of the second valve to communicate with one another.

* * * * *